United States Patent Office 2,764,079
Patented Sept. 25, 1956

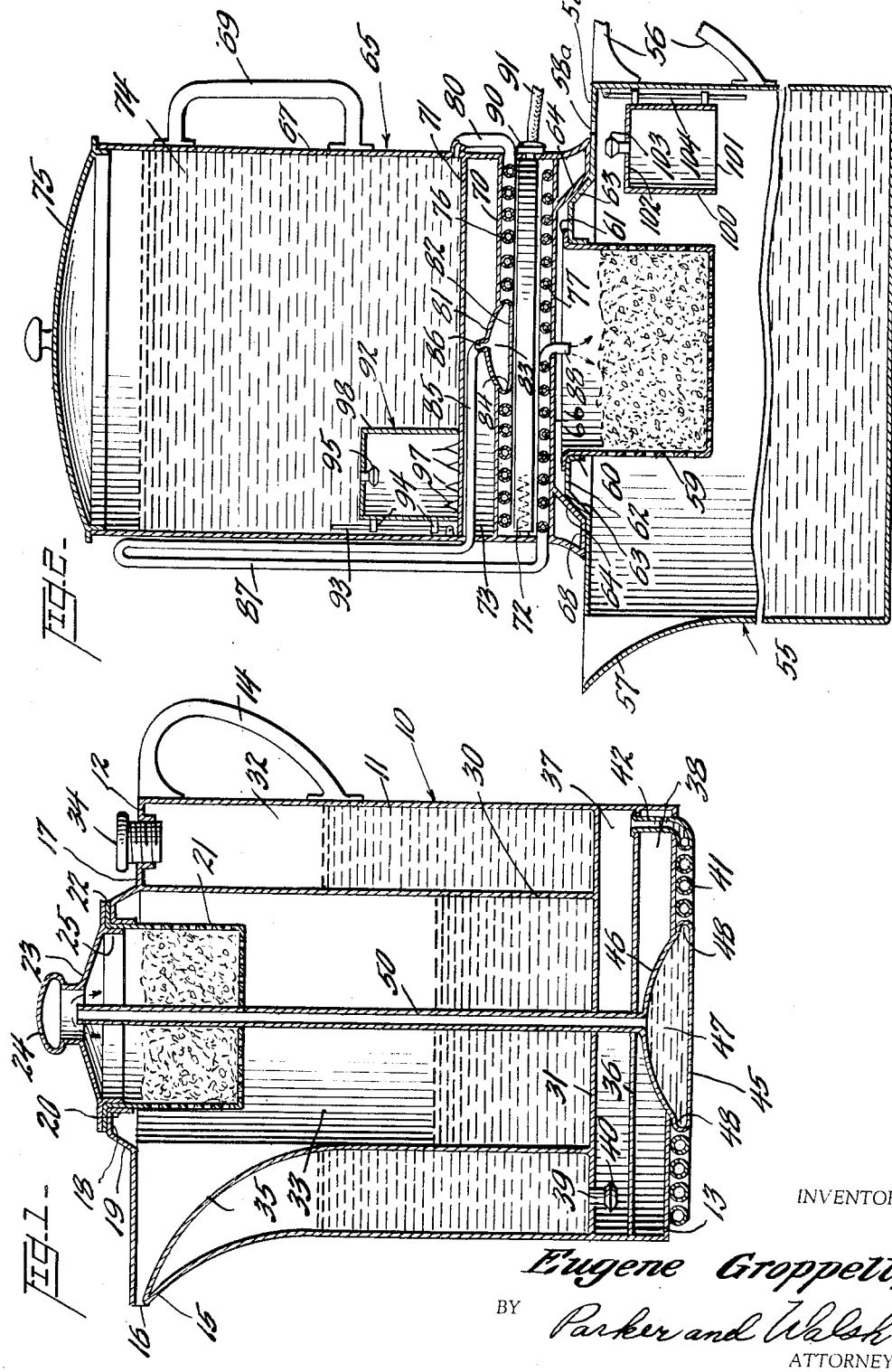

2,764,079
INFUSION APPARATUS
Eugene Groppell, New Orleans, La.

Application January 16, 1953, Serial No. 331,660

2 Claims. (Cl. 99—305)

This invention relates to infusion apparatus for making infusions of coffee, tea and the like and aims generally to improve and simplify the construction and operation of apparatus of this type.

A principal object of the invention is the provision of apparatus of the indicated type in which infusions of coffee, tea and the like, can be prepared extremely rapidly and with a minimum of heat.

A further object of the invention is the provision of apparatus of the indicated type wherein relatively small increments of fresh cold water are quickly brought to boiling and successively and continuously delivered to the substance to be infused.

Another object of the invention is the provision of infusion apparatus embodying a reservoir for fresh cold infusion liquid, wherein small quantities of infusion liquid are successively and continuously withdrawn from the reservoir, heated to boiling, and collected in a chamber, insulated from the reservoir, for delivery to the substance to be infused.

Still another object of the invention is the provision of apparatus of the indicated type embodying a reservoir for fresh cold water from which water is continuously withdrawn and quickly heated to boiling, wherein signal means are provided to give an audible warning when the reservoir has been emptied, or when the level of liquid therein has fallen below a certain point.

These and other objects and advantages of the invention will become more apparent from the following description, taken with the accompanying drawing, wherein:

Figure 1 is a central, vertical cross-sectional view through one form of apparatus, suitable for carrying out the purposes of the invention.

Figure 2 is a central, vertical cross-sectional view of a modified form of apparatus in accordance with the invention.

Referring to Figure 1 of the drawing, the numeral 10 designates a vessel having a side wall 11, a top wall 12, and a bottom wall 13. This vessel may have any desired cross-sectional shape such as circular, oval, octagonal or the like, and is illustrated herein as being circular in shape. The vessel 10 is provided at one side thereof with a handle 14, secured to the wall 11 in any suitable manner, and at the opposite side thereof, with a spout 15 having an opening 16 therein.

The top 12 of the vessel has an outer flat portion 17 and an inner raised portion 18, connected with the flat portion 17 by an inclined wall portion 19. An annular flange 20 depends downwardly from the inner edge of the raised portion 18 and defines an opening for receiving a perforated receptacle 21 in which ground coffee, tea or similar infusion substance may be placed.

The receptacle 21 is supported in position by an outwardly extending flange 22 thereon which rests on the raised portion 18 of the tap 12. A closure member 23 is provided for closing the top of the receptacle 21 and has a knob or handle 24 formed thereon to facilitate removal and replacement of the closure member. The handle 24 is preferably hollow and formed of transparent material, such as glass, to permit visual inspection of the operation of the device, without removing the closure member. The member 23 rests on the flange 22 and has a depending annular flange 25 which snugly engages the side wall of the vessel 21.

Secured to and depending downwardly from the top 12, outwardly of the raised portion 18, is an annular partition wall 30. At its lower edge the wall 30 rests on, and is secured to, a transverse partition member 31, spaced from the bottom 13 of the vessel and secured to the side wall 11 thereof. The wall 30 and partition member 31 divide the upper portion of the vessel 10 into an outer annular chamber 32 for fresh cold water and an inner circular chamber 33 for the liquid infusion. Water is introduced into the chamber 32 through an opening in the top 12 normally closed by a cap or plug 34. Suitable vent means are provided in the cap 34 or in the top 12 to permit liquid to flow from the chamber 32 in a manner hereinafter described.

Adjacent the top, and at one side thereof, the wall 30 is formed with a spout 35, communicating with the opening 16 in the spout 15 and closed off from communication with the chamber 32. The spout 35 permits the infusion liquid to be poured from the chamber 33, as desired. However, since there is no communication between the chambers 32 and 33 there is no possibility that any of the water remaining in the chamber 32 will get into the brewed coffee in the chamber 33 or vice versa.

Intermediate the partition member 31 and the bottom 13 of the vessel is a second transverse partition member 36. This partition is likewise secured to the side wall 11 of the vessel and in conjunction therewith and with the bottom wall 13 and partition member 31 provides upper and lower chambers 37 and 38. The chamber 37 has communication with the annular fresh water chamber 32 through a conduit 39 equipped with a whistle 40.

The whistle 40 may be of any well known type which is adapted to be operated by the movement of air therethrough, but which is not effected by movement of water therethrough. Hence, as long as there is any liquid in the chamber 32 the whistle 40 will not be operated. However, as soon as the chamber 32 is empty air will pass through the whistle 40 and actuate same to give warning that all of the water has been used up.

Water from the chamber 37 passes into a spirally arranged coil 41, through a connecting conduit 42, secured in an opening in the partition member 36 and extending downwardly through the chamber 38 through an opening in the bottom 13. This spiral coil 41 is disposed against the bottom of the vessel and may, if desired, be secured thereto in any suitable manner, as by welding.

The inner loop of the coil 41 is preferably substantially circular in shape and has a flat plate 45 secured to the lower edge thereof and a dome shaped member 46 secured to the upper edge thereof. The inner turn of the coil, together with the members 45 and 46, forms a boiling water chamber 47, into which boiling water from the coil 41 passes through suitable openings 48 in the inner turn of the coil.

A tube 50 is secured to the dome shaped member 46 substantially centrally thereof, and extends upwardly through openings in the partitions 36 and 31 and through an opening in the bottom of the receptacle 21 to a position adjacent the knob 24 of the closure member 23. The member 50 has a restricted tubular passage therethrough through which boiling water from the chamber 47 is discharged onto the ground coffee, tea or the like in the receptacle 21.

In the embodiment of the invention shown in Fig. 2, the infusion liquid from the coffee, tea or other substance is collected in the receptacle 55 having a handle 56 at one side thereof and a spout 57 at the other. The top 58 of the receptacle is provided with a vent opening 58a and is arranged to support a perforated container 59 for the ground coffee, tea or the like and for this purpose is provided with a centrally disposed opening defined by a circular depending flange 60. As in the previous embodiment the container 59 is provided with an outwardly extending flange 61 which rests on a raised portion 62 of the top 58.

The raised portion 62 is joined to the top 58 by an inclined wall 63 which forms a shoulder against which a similarly shaped wall 64 of a vessel 65 is adapted to rest. The wall 64 depends downwardly from the bottom 66 of the vessel 65 and is joined to side wall 67 thereof by a horizontal wall portion 68 which is adapted to rest on the top 58 of the receptacle 55. The vessel 65 is removably positioned on the container 55 and has a handle 69 for removing and replacing same.

Above the bottom 66 the vessel 65 is provided with spaced transverse partition walls 70 and 71 to form a lower chamber 72, an intermediate chamber 73 and an upper chamber 74. The upper chamber 74 is designed to receive and hold a supply of fresh cold water and the open top thereof is normally closed by a removable closure member 75.

The chamber 72 has upper and lower spirally arranged coils of tubing 76 and 77 disposed therein and these may desirably be secured to the partition wall 70 and to the bottom 66 of the vessel respectively, by welding or the like. The outer turn of the coil 76 communicates with the chamber 74 through a conduit 80 and the inner turn of the coil 76 is secured to an upper dome shaped member 81 and a lower plate member 82 to provide a boiling water compartment 83 similar to the compartment 47, previously described. Openings 84 are provided in the inner turn of the coil 76 through which boiling water from the coil passes into the compartment 83.

A conduit 85 is secured to the top of the dome shaped member 81 and has a restricted passage 86 therethrough through which the boiling water from the compartment 83 is adapted to pass. The conduit 85 extends transversely of the chamber 73 through an opening in the wall 67 of the vessel 65 and is provided with a vertically disposed loop portion 87 arranged adjacent the wall of the vessel 65 and having its upper end disposed above the normal level of fresh cold water in the chamber 74. The outer leg of the loop portion 87 extends inwardly through the wall of the vessel 65, at its lower end, and is connected with the outer turn of the coil 77. At its inner end, the coil 77 has an extension 88 thereon which extends downwardly through an opening in the bottom 66 for discharging boiling water onto the ground coffee, tea or the like in the perforated vessel 59.

In this embodiment of the invention, the coils 76 and 77 are adapted to be heated by an electric heating element 90 arranged therebetween, and having connection with any suitable source of electric current through a conductor 91. A suitable switch or switches may, of course, be provided to control the supply of current to the heating coil.

Means are provided for giving an audible warning signal when the liquid in the chamber 74 falls below a certain predetermined level. Such means preferably comprise an inverted cup shaped member 92 having its lower open end resting on the partition wall 71. The member 92 may be held in position by a bracket 93 to which it is secured by rivets or bolts 94, the bracket 93, in turn, being carried by the wall 67 of the vessel 65. The member 92 communicates with the chamber 74 through a whistle device 95, mounted in the top wall 96 thereof, and through V-shaped notches 97, formed in the bottom edge of the side wall 98 thereof. The whistle device 95 may be of any well known type which will emit an audible signal when air passes therethrough but which is unaffected by the passage of water therethrough.

A similar type of signal device may also be provided for the receptacle 55 to give an audible warning when the liquid therein rises above a predetermined level. Such device may likewise comprise an inverted cup-shaped member 100 having an open bottom 101, a closed top 102, and a whistle device 103 mounted in the top 102. The member 100 is supported by a bracket 104, carried by the side wall of the receptacle 55, and is disposed adjacent the top of the receptacle as clearly shown in Fig. 2.

Operation

In the use of the device shown in Fig. 1 ground coffee, tea or other substance to be infused, is placed in the perforated container 21 and the closure cap 23 placed in position, as shown. The plug 34 is then removed and fresh cold water introduced into the chamber 32 to the desired level. The plug 34 is then replaced and the device placed on a gas burner, electric heating coil, or the like.

As fresh water is introduced into the chamber 32 it passes downwardly through conduit 39, whistle 40, chamber 37, conduit 42, coil 41 and chamber 47, into the restricted passageway in the tube 50 in which it rises to the same level as the water in the compartment 32. When the device is placed on a heating element, as previously indicated, the small amounts of water in the coil 41 and boiling water chamber 47 are quickly heated to boiling and bubbles begin to pass upwardly from the chamber 47 through the restricted passageway in the tube 50. This causes the boiling water to overflow the top of the tube 50 and fall into the substance to be infused contained in the vessel 21 through which it percolates downwardly and outwardly to extract the essence thereof, the extract collecting in the chamber 33.

As the boiling water passes through the coil 41, chamber 47 and tube 50, fresh water from the chamber 37 passes into the coil 41 through the conduit 42. This water is likewise quickly brought to boiling as it passes through the coils of the tube and the process continues until all of the water has been withdrawn from the chamber 32 and falls below the level of the whistle 40 in the chamber 37. As soon as this happens, air begins to flow through the whistle 40 causing the same to emit an audible signal to indicate that the supply of fresh water is substantially exhausted. The device may then be removed from the heating element, allowed to stand until the liquid has substantially drained from the material in the vessel 21, after which the infusion in the chamber 33 may be poured through the opening 16 of the spout 15.

An important advantage of the described arrangement is that it insures a constant and continuing supply of hot boiling water to the infusion substance thereby increasing the effectiveness of the infusion operation.

Another important advantage of the described arrangement is that it brings the boiling water to bear on the infusion substance in a fraction of the time required in previous devices for this purpose. Thus in one type of apparatus used for the purpose, it has been necessary to heat the water in a separate vessel and then pour it into the infusion apparatus. This has required considerable time and, in addition, by the time the water is poured into the infusion apparatus, it is usually no longer at the boiling point. In another form of apparatus for the purpose, wherein the water is heated in the infusion apparatus, the entire body of water must be brought to boiling before any boiling water is supplied to the infusion substance. This likewise requires a relatively long period of time.

In the present apparatus, on the other hand, small quantities of the infusion water are successively heated to boiling and supplied to the infusion substance in a fraction of the time previously required. Furthermore, the boiling water coil and the boiling water chamber are disposed for direct contact with a heating element and, in addition, are spaced from and well insulated from the fresh water chamber 32 by the intermediate chambers 37 and 38. Thus fresh water from the chamber 32 passes through an intermediate chamber 37 before passing into the coil 41. In addition, the boiling water compartment 47 extends upwardly into the air chamber 38 and is spaced from the partition 36 thereby insulating the boiling water chamber from the supply of fresh water.

In the operation of the embodiment of the invention illustrated in Fig. 2, the infusion substance is placed in the container 59, after which the vessel 65 is filled with water to the desired level and placed in position on the receptacle 55. Water in the chamber 74 fills the cup shaped member 92 and passes through the conduit 80, coil 76, and boiling water chamber 83, into the conduit 85. It then passes upwardly into the inner leg of the loop 87 and comes to rest at the same level therein as the level of water in the chamber 74. Current is then supplied to the heating element 90 which quickly heats the water in the coil 76 to boiling.

When the water in coil 76 and boiling water chamber 83 reaches boiling temperature the water begins to overflow the top of the loop 87 passing downwardly through the outer leg thereof into and through the coil 77, from which it is discharged through the outlet 88 onto the mass of infusion substance in the container 59. As the heated water passes through the coil 77, it is again subjected to heat from the heating element 90 to insure that it is at the boiling point as it is discharged onto the infusion substance in vessel 59.

In this embodiment of the invention, water from the cold water compartment 74 passes directly to the coil 76 through the conduit 80. However, the arrangement of the chamber 73, coil 76 and boiling water chamber 83, is similar to the arrangement of the chamber 38, coil 41 and chamber 47 of the embodiment previously described, and has like advantages. Thus the boiling water compartment 83 is arranged to extend into the air chamber 73 and is spaced from the partition 71 so as to be well insulated from the cold water chamber 74.

When the water in chamber 74 falls below the level of the whistle 95 of the cup shaped member 92, air is drawn through the whistle causing it to emit an audible warning signal that the fresh water is getting low. In like manner, as the level of liquid in the receptacle 55 rises above the lower end of the cup-shaped member 100, air in such member is forced through the whistle 103 causing it to emit an audible warning signal to indicate that the receptacle is getting full.

The whistles 40, 95 and 103 are of a type which will emit an audible sound when air passes therethrough but which will be unaffected by the passage of water therethrough. Whistles of this type are well known and are not further described herein.

The present invention thus provides highly effective and efficient forms of apparatus for making infusions of various substances in which successive small increments of water are quickly brought to boiling and continuously supplied to the substance to be infused at boiling temperature. While the embodiments of the invention herein illustrated and described are particularly adapted for the stated purpose of making infusions of various kinds they may also be used for other purposes. Thus, for example, if it is not desired to make infusions, they may be used as fast boiling water kettles to quickly provide any desired quantity of boiling water within the capacity of the apparatus. For such use, the receptacles 21 and 59 for holding the infusion substance are not needed and may, if desired, be discarded.

While preferred forms of apparatus have been shown, the invention is not to be construed as limited to the specific details illustrated and described except as included in the following claims.

I claim:

1. A coffee maker comprising a receptacle having a bottom wall and a plurality of transverse partitions disposed in spaced relation above said bottom wall to define an upper compartment, a lower compartment and an intermediate compartment, upper and lower spiral coils disposed in said lower compartment, the upper coil communicating at one end with the upper compartment and at its opposite end with a boiling water compartment, said boiling water compartment being mounted at least in part in said intermediate compartment, a tube having one end thereof connected to said boiling water compartment and its opposite end connected to the lower of said coils, and a heating element disposed between said coils.

2. A coffee maker of the type set forth in claim 1 in which the tube connecting said boiling water compartment and said lower coil is provided with an intermediate looped portion disposed outwardly of the receptacle adjacent a side wall thereof.

References Cited in the file of this patent

UNITED STATES PATENTS

| | | |
|---|---|---|
| Re. 22,022 | Peters | Feb. 10, 1942 |
| 76,514 | Patterson et al. | Apr. 7, 1868 |
| 222,402 | Hawley | Dec. 9, 1879 |
| 273,067 | Halstead | Feb. 27, 1883 |
| 429,139 | Malen | June 3, 1890 |
| 1,218,294 | Mintz | Mar. 6, 1917 |
| 1,385,593 | Strohbach | July 26, 1921 |
| 2,036,933 | Gomes | Apr. 7, 1936 |
| 2,169,852 | Scott | Aug. 15, 1939 |
| 2,212,905 | Toto | Aug. 27, 1940 |
| 2,385,132 | Graham | Sept. 18, 1945 |
| 2,485,247 | Wahl | Oct. 18, 1949 |
| 2,608,927 | Gaskell | Sept. 2, 1952 |

FOREIGN PATENTS

| | | |
|---|---|---|
| 458,466 | France | Aug. 7, 1913 |
| 529,159 | Great Britain | Nov. 14, 1940 |
| 937,616 | France | Mar. 15, 1948 |